US012761067B2

(12) United States Patent
Redfern et al.

(10) Patent No.: US 12,761,067 B2
(45) Date of Patent: Oct. 13, 2026

(54) WEIGHING USER INTERFACE FOR SMART RECIPES

(71) Applicant: Adaptics Limited, Dublin (IE)

(72) Inventors: Timothy James Redfern, Clonbur (IE); Benjamin Harris, Dublin (IE); Jonathan McCauley, Dublin (IE)

(73) Assignee: Adaptics Limited, Dublin (IE)

( * ) Notice: Subject to any disclaimer, the term of this patent is extended or adjusted under 35 U.S.C. 154(b) by 420 days.

(21) Appl. No.: 18/532,120

(22) Filed: Dec. 7, 2023

(65) Prior Publication Data

US 2024/0201005 A1 Jun. 20, 2024

Related U.S. Application Data

(60) Provisional application No. 63/433,413, filed on Dec. 16, 2022.

(51) Int. Cl.
*G01G 19/64* (2006.01)
*G01G 19/38* (2006.01)

(52) U.S. Cl.
CPC .......... *G01G 19/384* (2013.01); *G01G 19/64* (2013.01)

(58) Field of Classification Search
CPC .. G01G 19/384; G01G 19/64; G01G 23/3721; G01G 23/365
USPC ...................................................... 177/25.11
See application file for complete search history.

(56) References Cited

U.S. PATENT DOCUMENTS 8,829,365 B1 * 9/2014 Wallace ................ G06F 13/382 177/25.14
9,645,007 B2 5/2017 Wallace et al.
9,772,217 B2 9/2017 Wallace et al.
2018/0073915 A1 * 3/2018 Finnance .............. A47J 43/046

FOREIGN PATENT DOCUMENTS

EP 2607868 A1 * 6/2013 ........... G01G 23/365

* cited by examiner

*Primary Examiner* — Peter J Macchiarolo
*Assistant Examiner* — Mireille S Sadate-Moualeu
(74) *Attorney, Agent, or Firm* — Siritzky Law, PLLC

(57) ABSTRACT

A computer-implemented method, using a weighing mechanism operatively connected to a weighing application. The method includes drawing a progress arc on a user interface of the weighing application, where the drawing is based on a non-linear function of the target weight (Wt) for the particular ingredient, a total angle to be drawn when the target weight (Wt) has been met, and the current weight (w) of the particular ingredient.

12 Claims, 7 Drawing Sheets

FIG. 3A
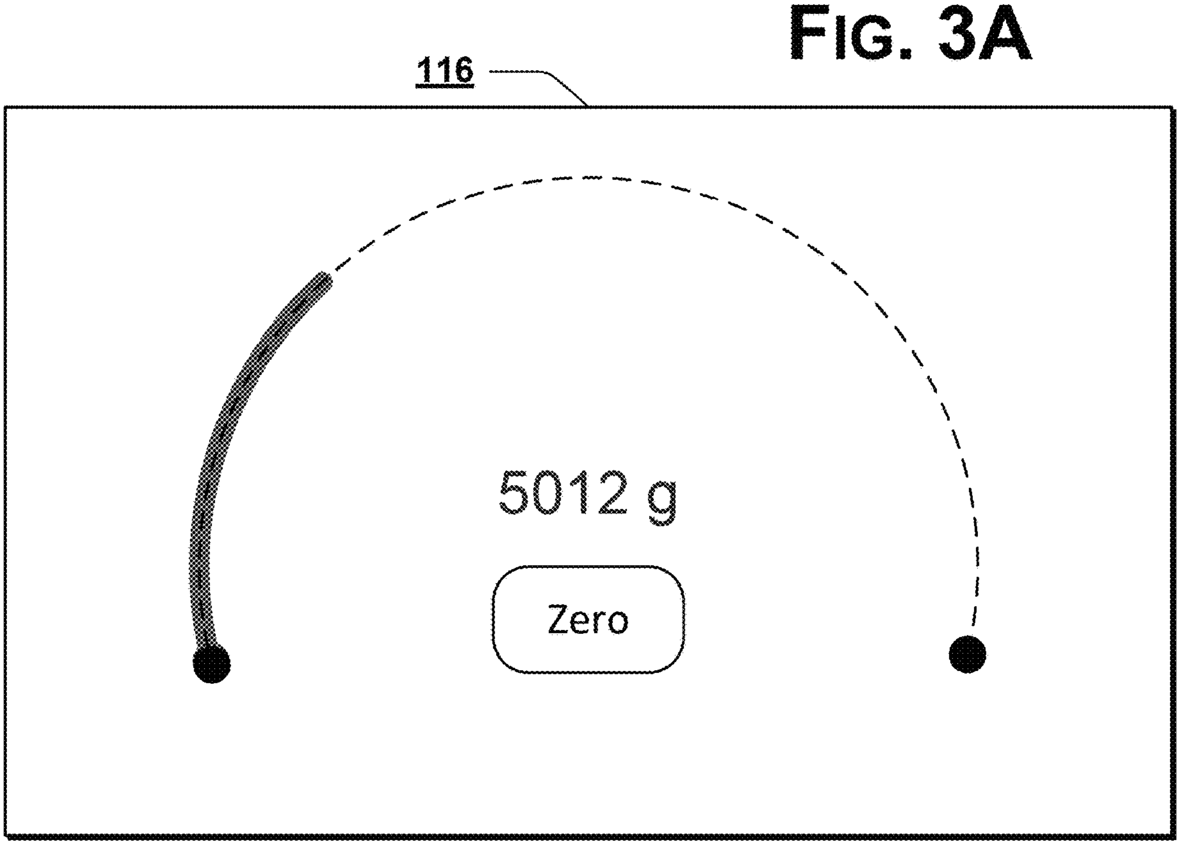
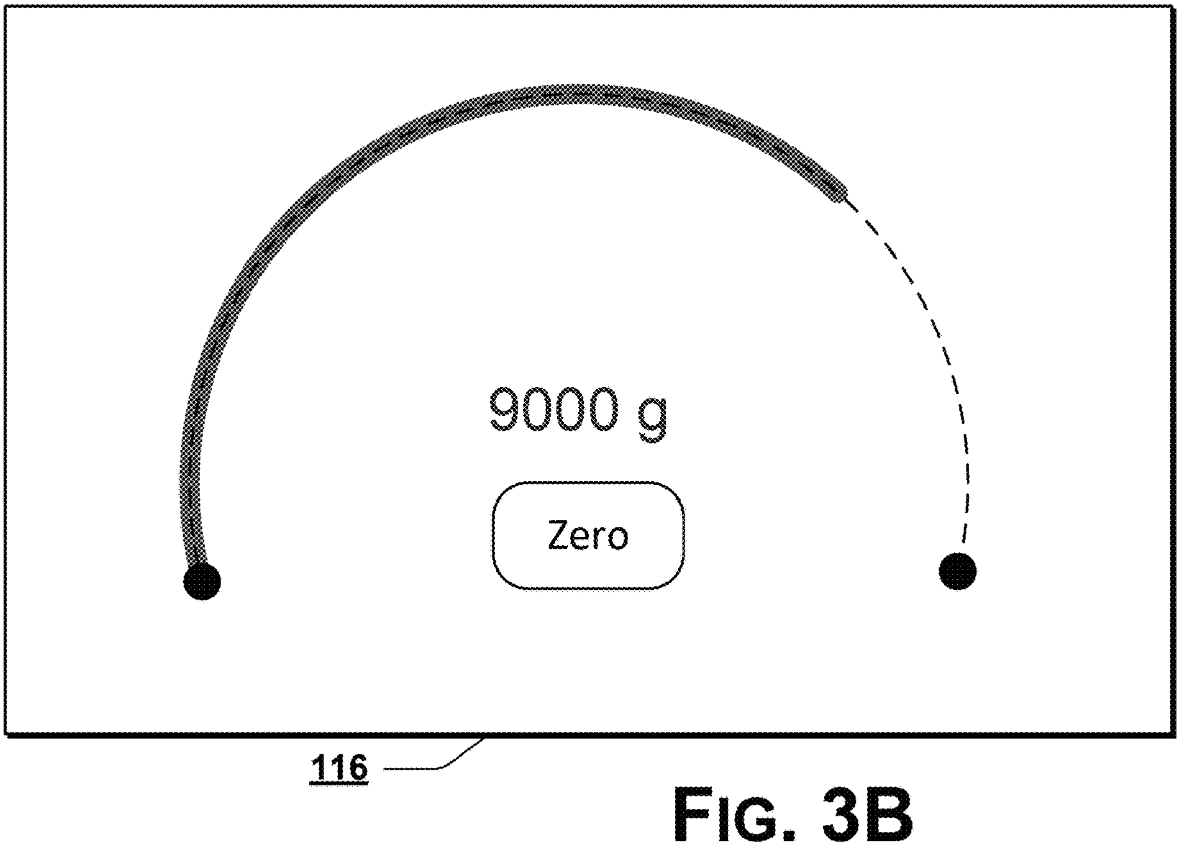
FIG. 3B

WEIGHING USER INTERFACE FOR SMART RECIPES

RELATED APPLICATIONS

This application claims the benefit of U.S. provisional patent application No. 63/433,413, filed Dec. 16, 2022, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

APPENDICES

This application includes the following appendices, which are part of this application:

Appendix A: Source Code example

FIELD OF THE INVENTION

Aspects of this invention relate to weighing ingredients for recipes, particularly within interactive recipes. More particularly, aspects of this invention relate to a scale and a user interface (UI) for the scale.

BACKGROUND

It is an object hereof to improve the user experience of interactive on-screen weighing through perceptual cues, which make the task of weighing an ingredient more intuitive and accurate.

SUMMARY

Aspects of the present invention are specified in the claims and the below description. Preferred embodiments are particularly specified in the dependent claims and the description of various embodiments.

A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by data processing apparatus, cause the apparatus to perform the actions.

A first general aspect includes a computer-implemented method using a weighing mechanism operatively connected to a weighing application.

The computer-implemented method also includes (A) determining a target weight (wt) for a particular ingredient. The method also includes (B) determining a target range based on the target weight. The method also includes (C) obtaining a current weight (w) of the particular ingredient on the weighing mechanism. The method also includes (D) calculating an angle (α) for a progress arc, the angle (α) being based on a non-linear function of (i) a total angle to be drawn when the target weight (wt) has been met, (ii) the current weight (w) of the particular ingredient, and (iii) the target weight (wt) for the particular ingredient. The method also includes (e) drawing the progress arc on a user interface of the weighing application, said drawing being based on the angle (α) calculated in (d). The method also includes (f) determining whether the current weight (w) of the particular ingredient on the weighing mechanism, as determined in (c), is within the target range, as determined in (b). The method also includes (g), based on said determining in (f), when the current weight is determined to not be within the target range, repeating steps (c)-(f), otherwise indicating that the target weight has been met.

Other embodiments of this aspect include corresponding computer systems, apparatus, and computer programs recorded on one or more computer storage devices, each configured to perform the actions of the methods.

Implementations may include one or more of the following features, alone or in combination(s): The method where the target range is within a fixed leeway of the target weight. The fixed leeway is about 5% of the target weight. The method may include repeating steps (a)-(g) for at least one other ingredient. The target range is based, at least in part, on a type of the particular ingredient. The target weight (wt) for the particular ingredient is obtained from a connected recipe. The weighing application is implemented, e.g., on a smartphone, a tablet computer, in a web browser, or on the screen of an appliance with an integrated UI.

Another general aspect includes a computer-implemented method of carrying out a recipe. The method may include: (a) obtaining a recipe item or step; (b) determining whether said recipe item or step obtained in (a) requires one or more ingredients to be weighed; (c) based on said determining in (b), weighing each of said one or more ingredients to be weighed using a method according to the first general aspect; and (d) repeating steps (a)-(c) while there are more recipe items or steps.

Another general aspect includes a computer-readable medium with one or more computer programs stored therein that, when executed by one or more processors of a device, cause the one or more processors to perform the operations of the computer-implemented methods of the general aspects described above. A device may include hardware, including one or more processors and memory. The device may include one or more computer programs stored in the memory that, when executed by the one or more processors of the device, cause the one or more processors to perform the operations of the computer-implemented methods described above. The device may include a scale. Implementations of the described techniques may include hardware, a method or process, or computer software on a computer-accessible medium.

The weighing UI may take the form of a dial giving interactive visual feedback along with the numerical measurement.

Below is a list of method (or process) embodiments. Those will be indicated with the letter "P." Whenever such embodiments are referred to, this will be done by referring to "P" embodiments.

P1. A computer-implemented method, using a weighing mechanism operatively connected to a weighing application, the method comprising:

(A) determining a target weight (Wt) for a particular ingredient;

(B) determining a target range based on the target weight;

(C) obtaining a current weight (w) of the particular ingredient on the weighing mechanism;

(D) calculating an angle (a) for a progress arc, the angle (α) being based on a non-linear function of:

(i) a total angle to be drawn when the target weight (Wt) has been met, (ii) the current weight (w) of the particular ingredient, and (iii) the target weight (Wt) for the particular ingredient;

(E) drawing the progress arc on a user interface of the weighing application, said drawing being based on the angle (α) calculated in (D);

(F) determining whether the current weight (w) of the particular ingredient on the weighing mechanism, as determined in (C), is within the target range, as determined in (B); and (G) based on said determining in (F), when the current weight is determined to not be within the target range, repeating steps (C)-(F), otherwise indicating that the target weight has been met.

P2. The method of embodiment P1, wherein the target range is within a fixed leeway of the target weight.

P3. The method of any of the method embodiments P1-P2, wherein the fixed leeway is about 5% of the target weight.

P4. The method of any of the method embodiments P1-P3, wherein the angle (α) for the progress arc is determined as:

$$\alpha = A \log_2(w/Wt + 1)$$

where (i) Wt is the target weight for the particular ingredient, (ii) A is the total angle to be drawn when the target weight (Wt) has been met, and (iii) w is the current weight of the particular ingredient.

P5. The method of any of the method embodiments P1-P4, further comprising:

repeating steps (A)-(G) for at least one other ingredient.

P6. The method of any of the method embodiments P1-P5, wherein the target range is based, at least in part, on a type of the particular ingredient.

P7. The method of any of the method embodiments P1-P6, wherein the target weight (Wt) for the particular ingredient is obtained from a connected recipe.

P8. The method of any of the method embodiments P1-P7, wherein the weighing application is implemented on a smartphone, a tablet computer, in a web browser, and/or on the screen of an appliance with an integrated user interface.

P9. A computer-implemented method of carrying out a recipe, the method comprising:

(a) obtaining a recipe item or step;

(b) determining whether said recipe item or step obtained in (a) requires one or more ingredients to be weighed;

(c) based on said determining in (b), weighing each of said one or more ingredients to be weighed using the method of any of the method embodiments P1-P8; and (d) repeating steps (a)-(c) while there are more recipe items or steps.

Below is a list of computer-readable medium embodiments. Those will be indicated with the letter "C." Whenever such embodiments are referred to, this will be done by referring to "C" embodiments.

C10. A computer-readable medium with one or more computer programs stored therein that, when executed by one or more processors of a device, cause the one or more processors to perform the operations of the method of any one of embodiments P1-P9.

C11. The computer-readable medium of embodiment C10, wherein the medium is non-transitory.

Below are one or more device embodiments. Those will be indicated with the letter "D." Whenever such embodiments are referred to, this will be done by referring to "D" embodiments.

D12. A device comprising hardware, including one or more processors and memory, the device comprising one or more computer programs stored in the memory, that, when executed by the one or more processors of the device, cause the one or more processors to perform the operations the computer-implemented method of any of embodiments P1-P9.

D13. The device of device embodiment(s) D12, wherein the device comprises a scale.

The above features and additional details of the invention are described further in the examples herein, which are intended to further illustrate the invention but are not intended to limit its scope in any way.

BRIEF DESCRIPTION OF THE DRAWINGS

Objects, features, and characteristics of the present invention, as well as the methods of operation and functions of the related elements of structure, and the combination of parts and economies of manufacture, will become more apparent upon consideration of the following description and the appended claims with reference to the accompanying drawings, all of which form a part of this specification.

FIGS. 3A and 3B are examples of the user interface, according to exemplary embodiments hereof;

DETAILED DESCRIPTION OF EXEMPLARY EMBODIMENTS

Glossary and Abbreviations

As used herein, unless used otherwise, the following terms or abbreviations have the following meanings:

The term "mechanism," as used herein, refers to any device(s), process(es), service(s), or combination thereof. A mechanism may be implemented in hardware, software, firmware, using a special-purpose device, or any combination thereof. A mechanism may be integrated into a single device, or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Description

Overview and Structure

Figure 1:
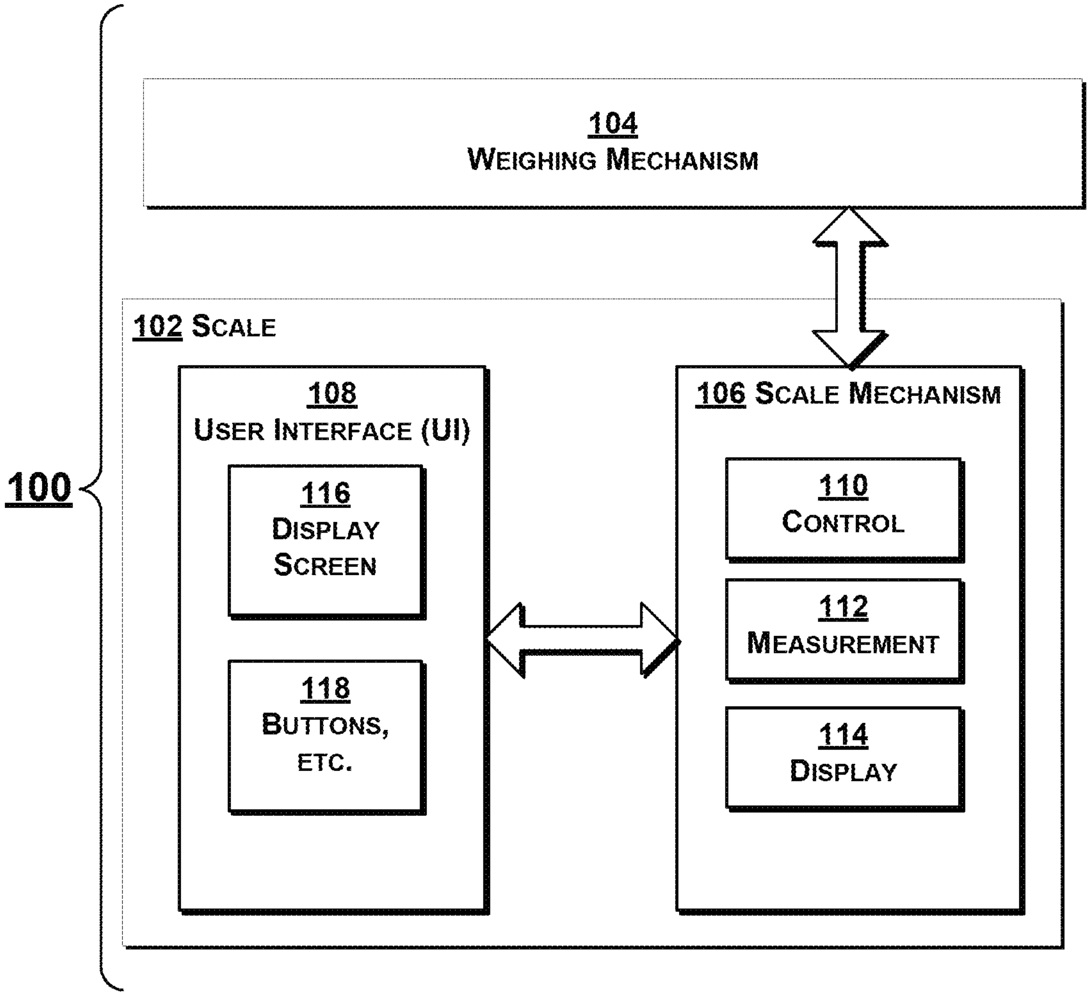
FIG. 1 depicts aspects of an exemplary device employing a user interface according to exemplary embodiments hereof.

FIG. 1 depicts aspects of an exemplary device 100 employing a user interface (UI) according to exemplary embodiments hereof. As shown in FIG. 1, a device 100 includes, in combination, a scale 102 operatively connected to a weighing mechanism 104. The scale 102 and weighing mechanism 104 may be integrated (e.g., as a single device), or the two components may be separated (e.g., by a wire).

The scale 102 includes scale mechanism(s) 106, connected to the weighing mechanism 104. The scale mechanism(s) 106 are connected to a user interface, UI 108.

As should be appreciated, the scale mechanism(s) 106 may be or comprise computing devices (discussed in greater detail below) and may include one or more processors, memory, communications mechanisms, etc. The scale mechanism(s) 106 include control mechanism(s) 110, measurement mechanism(s) 112, and display mechanism(s) 114. The scale mechanism(s) 106 may include general purpose and/or special purpose processors to implement the various features. Although shown in the drawing as separate components for this description, it should be appreciated that the control mechanism(s) 110, measurement mechanism(s) 112, and display mechanism(s) 114 may be integrated into a single mechanism.

The user interface 108 may comprise a display screen 116 (e.g., a touch screen), alone or in combination with one or more buttons and/or switches 118 on the device 100.

Aspects of the scale 102 may be implemented using an application (app) on a device such as a smartphone, a tablet computer (e.g., an iPad), or the like, in a web browser, or on the screen of an appliance with an integrated UI. The device (e.g., smartphone) may connect to the weighing mechanism 104, e.g., using Bluetooth or the like. In such cases, the user interface 108 may comprise the display of the device (e.g., smartphone), and the scale mechanism(s) 106 may be incorporated into the application on the device.

The user interface 108 preferably includes a "zero" option or button or switch to zero the scale. In that way, the weight of anything already on the scale (e.g., a container, object, ingredients, etc.) can be ignored when something is to be weighed. When the "zero" option/button is selected (e.g., on the screen 116), the control mechanism(s) 110 sets the current weight to zero, regardless of what is on the weighing mechanism 104.

As is well known, amounts to be measured (weighed) are placed on the weighing mechanism 104, and the current weight of what is on the weighing mechanism 104 may be displayed on the user interface 108.

Displaying Amounts on the User Interface

When items are placed on the scale (on the weighing mechanism 104), their weight is displayed on screen 116 of the user interface 108. In embodiments hereof, the measurement mechanism(s) 112 determine the weight of whatever is on the scale, and the display mechanism(s) 114 display a representation of that weight (e.g., as a number in grams or ounces).

When the device 100 is used for food preparation, it may be used to measure (weigh) one or more ingredients. For example, a single ingredient (e.g., flour, sugar, etc.) may be poured into a container on the weighing mechanism 104. In such cases, as more of the ingredient is added to the container, the display mechanism(s) 114 updates the representation of the weight of what is in the container.

Figure 2:
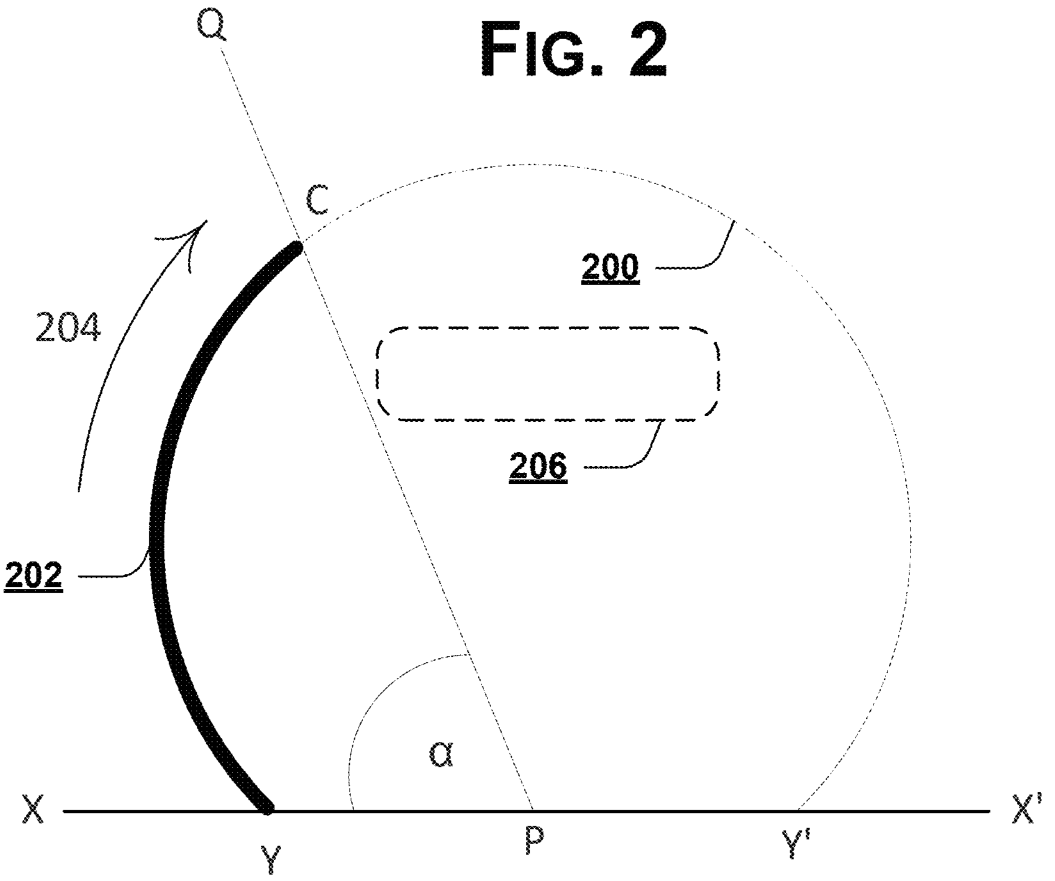
FIG. 2 depicts aspects of a user interface according to exemplary embodiments hereof.

FIG. 2 shows aspects of the user interface according to exemplary embodiments hereof. In the example in FIG. 2, the arc 200 (Y-Y') depicts the required or target amount (weight) of an ingredient to be added (or being added), while the progress arc 202 (Y-C) depicts the amount already added. As more ingredient is added (i.e., put on the weighing mechanism 104), the progress arc 202 grows clockwise (in the direction depicted by the arrow 204). When the required or target amount of the ingredient has been added, the progress arc 202 will cover the arc 200 (Y-Y'). The progress arc 202 may also be referred to as a progress dial.

In addition to the progress arc 202, the user interface 108 preferably includes a textual display 206 of the current weight and may include, as text, the target weight.

The user interface 108 thus provides a dial giving interactive visual feedback along with the numerical measurement.

Although shown as a black line in the drawings, those skilled in the art will understand, upon reading this description, that different colors and densities may be used to show progress in the user interface 108. For example, the color of the progress arc may change as the target weight is approached. Similarly, the color of the text showing the current weight may change (e.g., from white to green) as the target weight is approached.

Non-Linear (e.g., Logarithmic) Scale

When the weighing dial (progress arc 202) is shown, the angular length of the arc representing the measured weight uses a logarithmic rather than a linear scale. If the total angle drawn is A and the total weight scale is W, for a measured weight w, the angle α that the drawn arc subtends is given by the formula:

$$\alpha = A \log_2(w/Wt + 1) \quad (1)$$

Thus, the weight indicator decelerates through the process of adding an ingredient.

For example, if the total angle drawn is 270°, and the target weight is 400 grams, the angle α' that the drawn arc subtends is given by the formula:

$$\alpha' = 270 \log_2(w/400 + 1) \quad (1')$$

Those of skill in the art will understand, upon reading this description, the different and/or other non-linear scales may be used to show progress. In addition, linear and non-linear scales may be used in combination. For example, the weight indicator (progress arc 202) may only slow after reaching a certain percentage (e.g., 50%) of the target weight.

Target Weight

When weighing an ingredient, the user interface 108 displays a target weight and indicates success when the target weight is reached. The target weight may also track progress in a multi-step recipe. For example, when the device 100 is used to prepare a multi-step recipe, the system may use the completion of a weighing step to move forward to the next step in the recipe automatically (e.g., without other user interaction).

In some implementations, e.g., when following a multi-step recipe, the target weight may be allowed to vary. That is, rather than requiring an exact weight when the measured weight falls within an adaptive target window or range, the user interface 108 indicates the weight is complete and moves on automatically to the following recipe step.

In a preferred implementation, the weight may vary by ±5% of the target weight (up to a maximum of 10 g). That is, the acceptable weight range is given by:

$$[\text{Target weight} - \text{leeway}, \text{Target weight} + \text{leeway}],$$

-continued $$\text{where leeway} = \max(10, 5\% \text{ of Target weight})$$

For example, a 100 g target would have a leeway weight of 5 g, making the range 95 g→105 g. A 350 g target would have a leeway weight of 10 g making the range 340 g→360 g These values have been established through user testing and balance various factors, including the accuracy needed for recipes, the accuracy of the scale, and the quantity of ingredients used in recipes.

FIGS. 3A and 3B are examples of a progress display on the display screen 116 of the user interface 108. In FIG. 3A, the progress arc represents 5,012 grams. In FIG. 3B, the progress arc represents 9,000 grams.

When weighing an ingredient in a recipe, the weighing UI shows the target weight that must be reached, with feedback indicated by UI elements changing color.

Figure 4A:
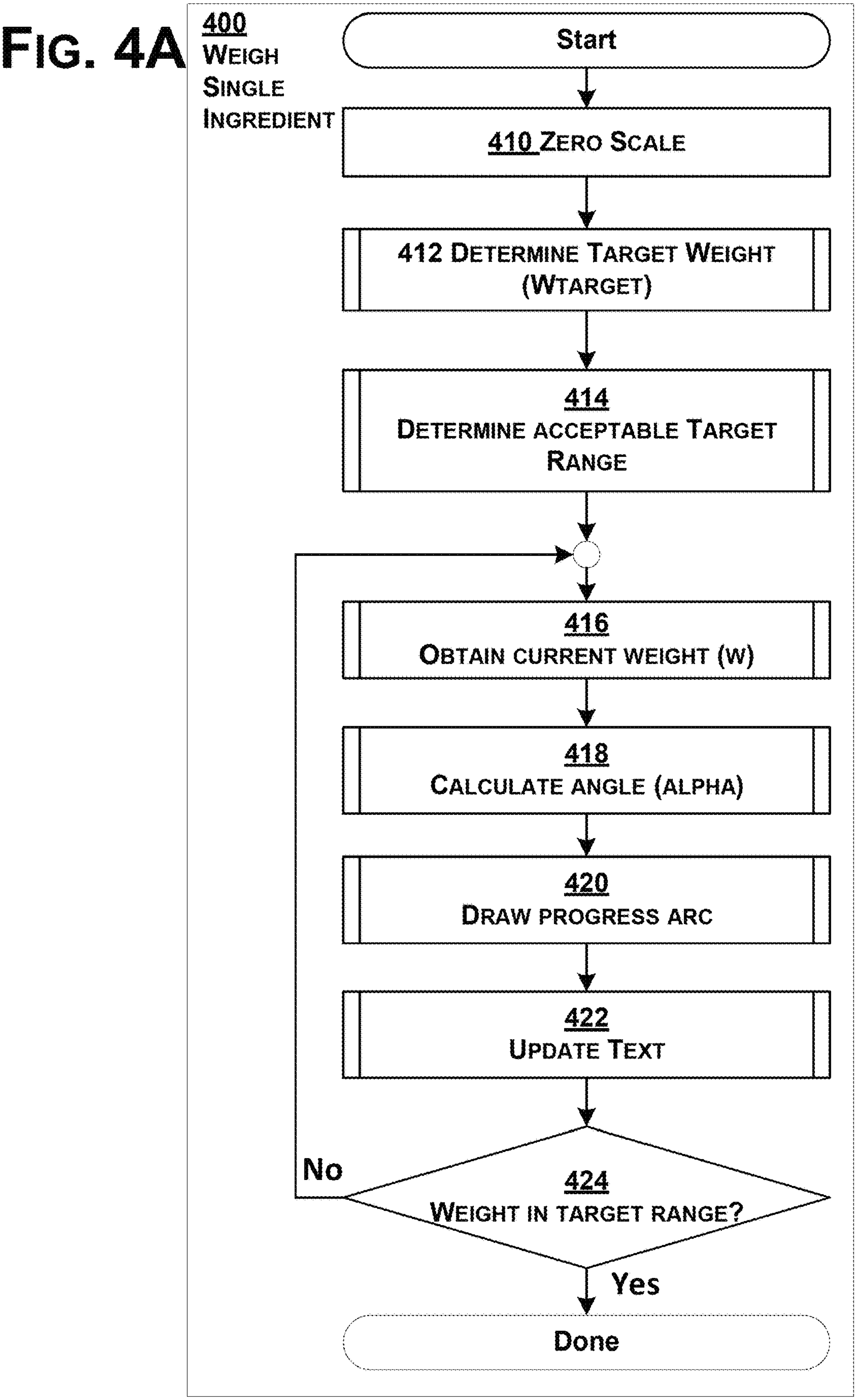
FIGS. 4A-4C are flowcharts depicting aspects of using the scale and user interface according to exemplary embodiments hereof.
Figure 4B:
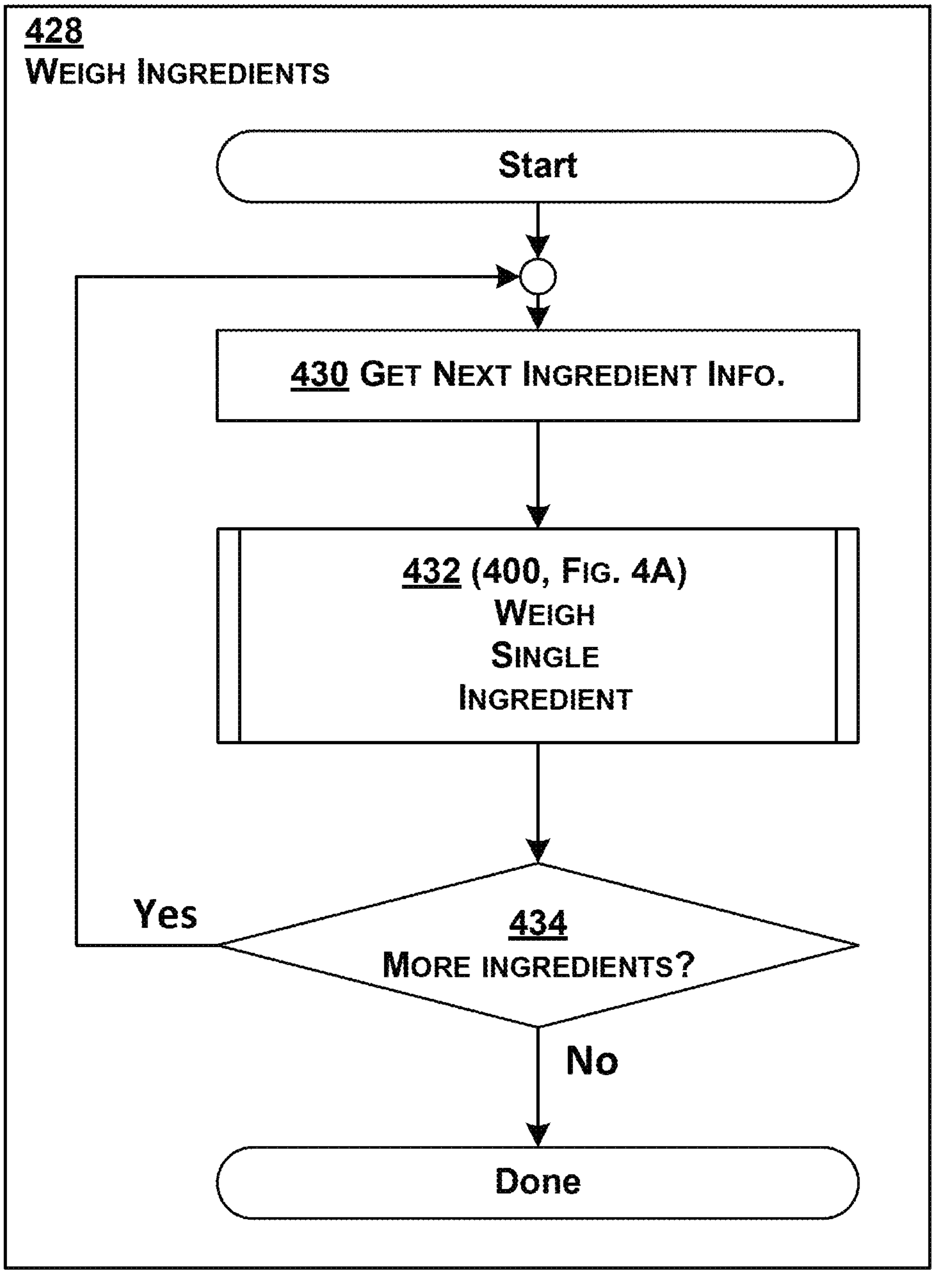
Figure 4C:
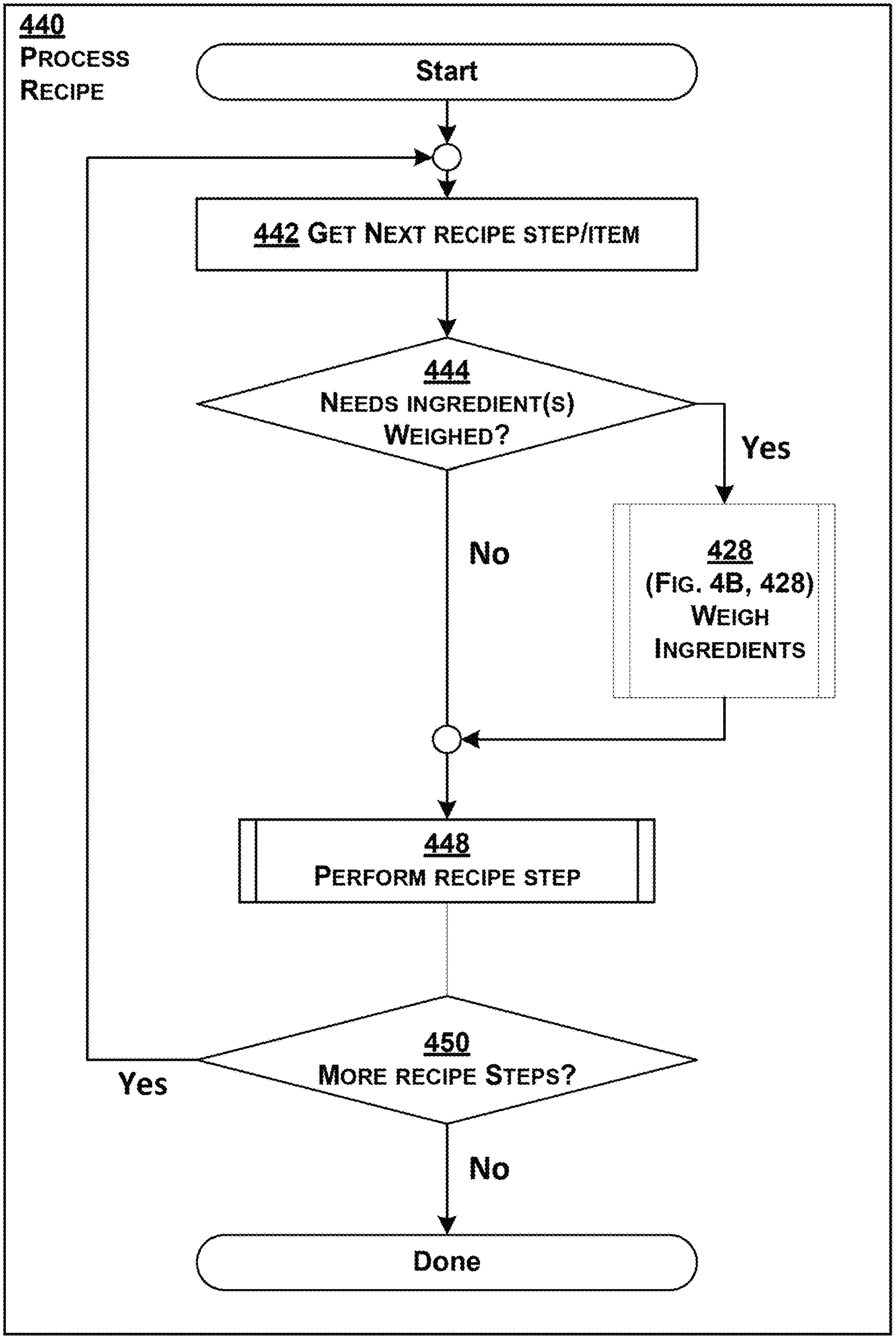

FIGS. 4A-4C are flowcharts depicting aspects of using the scale and user interface according to exemplary embodiments hereof.

The flowchart in FIG. 4A shows aspects of a process 400 of weighing a single ingredient using the device 100, according to exemplary embodiments hereof. First, the scale is zeroed (at 410). Then the target weight (Wtarget) is determined (at 412). The target weight may be obtained from a connected recipe or the like or input by the user. Then an acceptable target range may be determined (at 414). The target range may be determined, e.g., as described above, by determining an acceptable leeway (e.g., leeway=max(10, 5% of Target weight)), where the acceptable target range is $$[\text{Target weight} - \text{leeway}, \text{Target weight} + \text{leeway}]$$

Next, the current weight (w) is obtained (at 416) by the measurement mechanism(s) 112 from the weighing mechanism 104. The angle (α) is determined (at 418) based on the current weight (w) and the target weight (Wtarget), e.g., as described above with respect to formula #1. As should be understood, the total angle to be drawn is preferably preset (e.g., 270°).

With the angle (α) calculated at 420, the display mechanism(s) 114 draws the progress arc on the display screen 116 of the user interface 108. The display mechanism(s) 114 may also update the textual display 206 of the user interface 108 to reflect the current weight (w).

The scale mechanism 106 then determines (at 424) if the current weight (w) is in the target range. If it is determined that the current weight (w) is within the target range, then the scale is done weighing this ingredient. Otherwise, it continues (at 416, etc.).

The flowchart in FIG. 4B shows aspects of process 428 of weighing one or more ingredients using the device 100, according to exemplary embodiments hereof. The process 428 of weighing one or more ingredients essentially repeats the process (described above with reference to FIG. 4A) for each ingredient.

With reference to FIG. 4B, the process 428 obtains information about the next ingredient (at 430). This information includes the type of ingredient and its target weight. The process 428 then invokes the process 400 of weighing a single ingredient (described above with respect to FIG. 4A). If there are more ingredients (as determined at 434), the system weighs the next ingredient (at 430, 432). Otherwise, it is done. The ingredient information may be input by a user or obtained automatically from a connected recipe or the like.

Using the process 428, the system may automatically move the next ingredient once an ingredient has reached its target weight. However, it may be desirable to pause to confirm that the user has noticed that the target weight was completed. The user may be guided by other information on the user interface 108 or on some other interface (not shown).

The flowchart in FIG. 4C shows aspects of a process 440 of processing a recipe using the device 100, according to exemplary embodiments hereof. The recipe may be obtained, e.g., from a connected device or the like, and preferably contains a list of ingredients and steps. The recipe may be a connected recipe, e.g., as described in U.S. application No. 63/410,340, titled "Synchronized recipe use with connected kitchen appliances," filed 27 Sep. 2022, the entire contents of which are hereby fully incorporated herein by reference for all purposes.

To process a recipe (440), the system gets the next recipe step or item (at 442) and determines (at 444) if one or more ingredients need to be weighed. If ingredient(s) need to be weighed (as determined at 444), the system weighs the ingredient(s) (at 428), using the process 428 described above with respect to FIG. 4B. The recipe process 440 then proceeds with the following recipe step (at 448). If there are no more recipe steps (as determined at 450), then the recipe process 400 is complete. Otherwise, it continues (at 442) with the following recipe step/item.

Source Code

Appendix A includes a reference implementation in Apple's Swift language for use by iOS apps.

The Logarithmic scale algorithm is implemented by the functions _targetRatio and _logWeight. The target weight window is implemented as autoprogressLeeway.

Discussion

The inventors believe that the non-linear deceleration of the progress arc on the UI may subconsciously dispose the user to think that the weighing is nearer completion than it is and slow down pouring/adding the ingredient, which reduces the risk of an overpour (which can be awkward to deal with when weighing all ingredients into one bowl). Moreover, this perceptual cue compensates for the latency, or lag, between increasing the amount of the added ingredient and the UI reflecting this change.

The weighing user interface may be used as a standalone system or in combination with smart appliances, wherever weighing is performed interactively to measure an ingredient for use in a recipe.

Weighing an ingredient allows a recipe to be scaled to suit the quantity of this ingredient.

Computing

The applications, services, mechanisms, operations, and acts shown and described above are implemented, at least in part, by software running on one or more computers.

Programs that implement such methods (as well as other types of data) may be stored and transmitted using a variety of media (e.g., computer-readable media) in several manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general-purpose computers, special-purpose computers, and computing devices. One or more such computers or computing devices may be referred to as a computer system.

Figure 5:
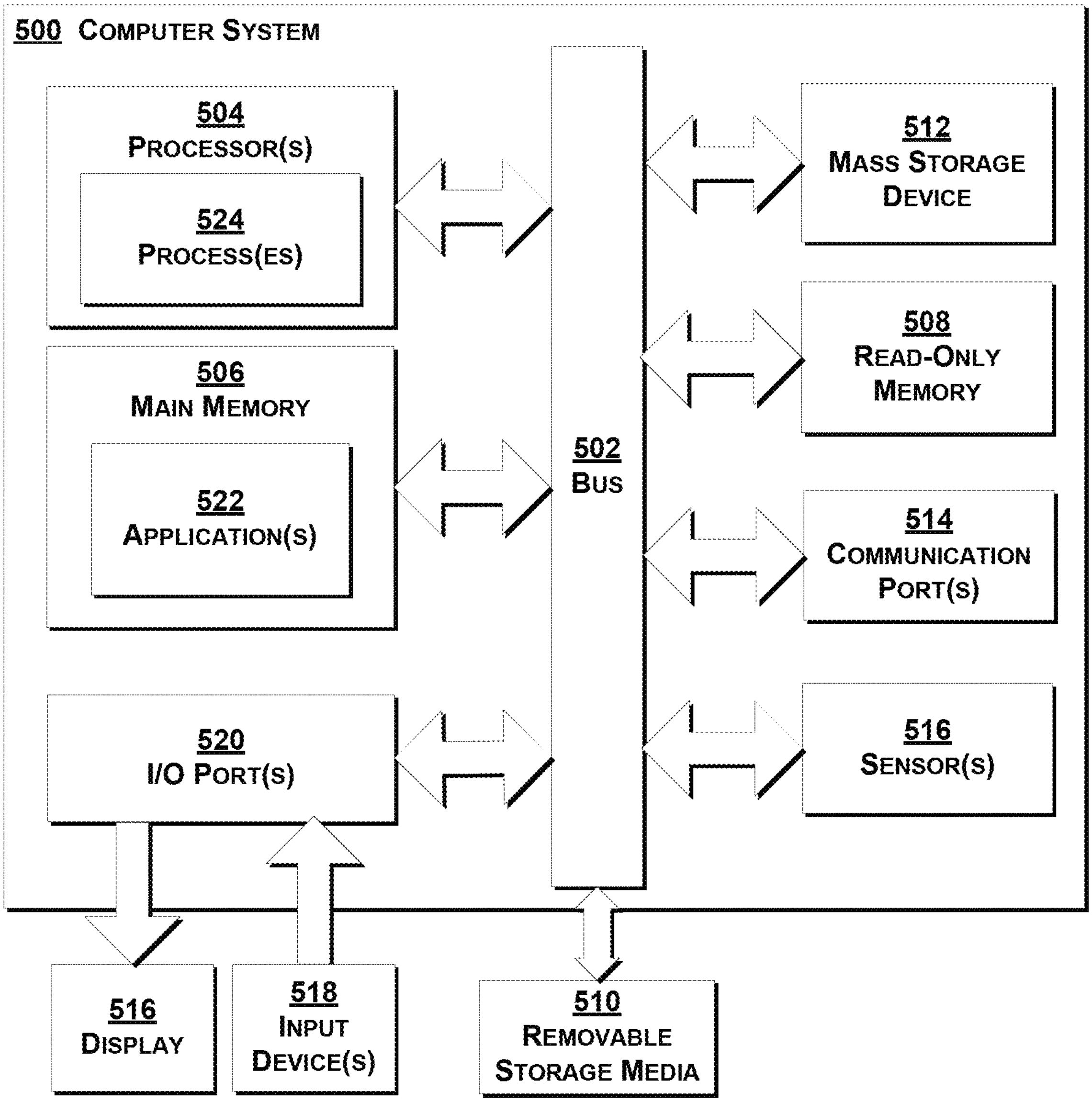
FIG. 5 depicts aspects of computing according to exemplary embodiments hereof.

FIG. 5 is a schematic diagram of a computer system 500 upon which embodiments of the present disclosure may be implemented and carried out.

According to the present example, the computer system 500 includes a bus 502 (i.e., interconnect), one or more processors 504, a main memory 506, read-only memory 508, removable storage media 510, mass storage 512, and one or more communications ports 514. Communication port(s) 514 may be connected to one or more networks (not shown) by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input and output devices that are appropriate to perform the process.

Processor(s) 504 can be any known processor(s) (e.g., including, without limitation, processors and microcontrollers based on the ARM, Risc-V, and Xtensa architectures). Communications port(s) 514 can be any of an Ethernet port, a Gigabit port using copper or fiber, a USB port, and the like. Communications port(s) 514 may be chosen depending on a network such as a Local Area Network (LAN), a Wide Area Network (WAN), a low-rate wireless personal area network (LR-WPAN), or any network to which the computer system 500 connects. The computer system 500 may be in communication with peripheral devices (e.g., display screen 516, input device(s) 518) via Input/Output (I/O) port 520.

Main memory 506 can be Random Access Memory (RAM) or any other dynamic storage device(s) commonly known in the art. Read-only memory (ROM) 508 can be any static storage device(s), such as Programmable Read-Only Memory (PROM) chips for storing static information, such as instructions for processor(s) 504. Mass storage 512 can be used to store information and instructions. For example, hard disk drives, an optical discs, an array of disks such as Redundant Array of Independent Disks (RAID), or other mass storage devices.

Bus 502 communicatively couples processor(s) 504 with the other memory, storage, and communications blocks. Bus 502 can be a PCI/PCI-X, SCSI, a Universal Serial Bus (USB) based system bus (or other) depending on the storage devices used and the like. Removable storage media 510 can be any kind of external storage, including hard-drives, floppy drives, USB drives, Compact Disc-Read-Only Memory (CD-ROM), Compact Disc-ReWritable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) that may be read by a computer, a processor or a like device. Such a medium may take many forms, including but not limited to non-volatile media, volatile media, and transmission media. Non-volatile media include, for example, optical or magnetic disks and other persistent memory. Volatile media include dynamic random access memory, which typically constitutes the computer's main memory. Transmission media include coaxial cables, copper wire, and fiber optics, including the wires that comprise a system bus coupled to the processor. Transmission media may include or convey acoustic waves, light waves, and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other types of media/machine-readable medium suitable for storing electronic instructions. Moreover, embodiments herein may also be downloaded as a computer program product. The program may be transferred from a remote computer to a requesting computer by way of data signals embodied in a carrier wave or other propagation medium via a communication link (e.g., modem or network connection).

Various forms of computer-readable media may carry data (e.g., sequences of instructions) to a processor. For example, data may be (i) delivered from RAM to a processor; (ii) carried over a wireless transmission medium; (iii) formatted and/or transmitted according to numerous formats, standards, or protocols; and/or (iv) encrypted in any of a variety of ways well known in the art.

A computer-readable medium can store (in any appropriate format) the appropriate program elements to perform the methods.

As shown, main memory 506 is encoded with application (s) 522 that support(s) the functionality as discussed herein (the application(s) 522 may be an application(s) that provides some or all of the functionality of the services/mechanisms described herein). Application(s) 522 (and/or other resources as described herein) can be embodied as software code such as data and/or logic instructions (e.g., code stored in the memory or on another computer-readable medium such as a disk) that supports processing functionality according to different embodiments described herein.

During operation of one embodiment, processor(s) 504 accesses main memory 506 via bus 502 to launch, run, execute, interpret, or otherwise perform the logic instructions of the application(s) 522. Execution of application(s) 522 produces processing functionality of the service related to the application(s). In other words, the process(es) 524 represent one or more portions of the application(s) 522 performing within or upon the processor(s) 504 in the computer system 500.

It should be noted that in addition to the process(es) 524 that carries(carry) out operations as discussed herein, other embodiments herein include the application 522 itself (i.e., the unexecuted or non-performing logic instructions and/or data). The application 522 may be stored on a computer-readable medium (e.g., a repository) such as a disk or in an optical medium. According to other embodiments, the application 522 can also be stored in a memory type system such as in firmware, read-only memory (ROM), or, as in this example, as executable code within the main memory 506 (e.g., within Random Access Memory or RAM). For example, application(s) 522 may also be stored in removable storage media 510, read-only memory 508, and/or mass storage device 512.

Those skilled in the art will understand that computer system 500 can include other processes and/or software and hardware components, such as an operating system that controls the allocation and use of hardware resources.

As discussed herein, embodiments of the present invention include various steps or operations. A variety of these steps may be performed by hardware components or embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, including hardware, software, firmware, or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

CONCLUSION

Where a process is described herein, those of ordinary skill in the art will appreciate that the process may operate without any user intervention. In another embodiment, the process includes some human intervention (e.g., an act is performed by or with the assistance of a human).

As used herein, including in the claims, the phrase "at least some" means "one or more" and includes the case of only one. Thus, e.g., the phrase "at least some ABCs" means "one or more ABCs" and includes the case of only one ABC.

As used herein, including in the claims, the term "at least one" should be understood as meaning "one or more," and therefore includes both embodiments that include one or multiple components. Furthermore, dependent claims that refer to independent claims that describe features with "at least one" have the same meaning, both when the feature is referred to as "the" and "the at least one."

As used herein, including in the claims, the phrase "using" means "using at least" and is not exclusive. Thus, e.g., the phrase "using x" means "using at least x." Unless specifically stated by the use of the word "only," the phrase "using x" does not mean "using only x."

As used herein, including in the claims, the phrase "based on" means "based in part on" or "based, at least in part, on" and is not exclusive. Thus, e.g., the phrase "based on factor x" means "based in part on factor x" or "based, at least in part, on factor x." Unless specifically stated by the use of the word "only," the phrase "based on x" does not mean "based only on x."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "x is distinct from Y" means that "x is at least partially distinct from Y" and does not mean that "x is fully distinct from Y." Thus, as used herein, including in the claims, the phrase "x is distinct from Y" means that x differs from Y in at least some way.

It should be appreciated that the words "first," "second," and so on in the description and claims are used to distinguish or identify and not to show a serial or numerical limitation. Similarly, letter labels (e.g., "(A)," "(B)," "(C)," and so on, or "(a)," "(b)," and so on) and/or numbers (e.g., "(i)," "(ii)," and so on) are used to assist in readability and to help distinguish and/or identify and are not intended to be otherwise limiting or to impose or imply any serial or numerical limitations or orderings. Similarly, words such as "particular," "specific," "certain," and "given" in the description and claims, if used, are to distinguish or identify and are not intended to be otherwise limiting.

As used herein, including in the claims, the terms "multiple" and "plurality" mean "two or more" and include the case of "two." Thus, e.g., the phrase "multiple ABCs" means "two or more ABCs" and includes "two ABCs." Similarly, e.g., the phrase "multiple PQRs," means "two or more PQRs," and includes "two PQRs."

The present invention also covers the exact terms, features, values, and ranges, etc., in case these terms, features, values, and ranges, etc. are used in conjunction with terms such as about, around, generally, substantially, essentially, at least, etc. (for example, "about 3" or "approximately 3" shall also cover exactly 3 or "substantially constant" shall also cover exactly constant).

As used herein, including in the claims, singular forms of terms are to be construed as also including the plural form and vice versa unless the context indicates otherwise. Thus, it should be noted that as used herein, the singular forms "a," "an," and "the" include plural references unless the context clearly dictates otherwise.

Throughout the description and claims, the terms "comprise," "including," "having," and "contain" and their variations should be understood as meaning "including but not limited to" and are not intended to exclude other components unless specifically so stated.

It will be appreciated that variations to the embodiments of the invention can be made while still falling within the scope of the invention. Alternative features serving the same, equivalent, or similar purpose can replace features disclosed in the specification unless stated otherwise. Thus, unless stated otherwise, each feature disclosed represents one example of a generic series of equivalent or similar features.

Use of exemplary language, such as "for instance," "such as," "for example" ("e.g.,") and the like, is merely intended to illustrate the invention better and does not indicate a limitation on the scope of the invention unless specifically so claimed. The abbreviation "i.e." means "that is."

While a particular feature of the invention may have been disclosed with respect to only one of several implementations, such feature may be combined with one or more other features of the other implementations as may be desired and advantageous for any given or particular application. Furthermore, to the extent that the terms "includes," "including," and variants thereof are used in either the detailed description or the claims, these terms are intended to be inclusive in a manner similar to the term "comprising."

While the invention has been described in connection with what is presently considered to be the most practical and preferred embodiments, it is to be understood that the invention is not to be limited to the disclosed embodiment but, on the contrary, is intended to cover various modifications and equivalent arrangements included within the spirit and scope of the appended claims.

APPENDIX A

```
extension WeighMeterView {
  // Weights
  // simple log scale solution
  fileprivate func _logWeight(_ x: Double) -> CGFloat {
    return CGFloat(log2(x + 1))
  }
  fileprivate func _updateAmountFormat( ) {
    let attributedText =
_amountFormatter.attributedStringForWeight(currentWeight,
metric: currentMetric)
    gcd_async_main { [weak self] in
      guard let welf = self else { return }
      welf._amountLabel.attributedText = attributedText
    }
  }
  /// Auto-Progress window is +/- 5% of target weight up to
a max of 10g
  var autoprogressLeeway: Weight?{
    guard let targetWeight = targetWeight else { return nil
}
    return min(targetWeight * 0.05, Weight(grams: 10))
  }
  /// This is the perceived target position for the user
  /// It is the beginning of the autoprogress window
  var displayedTargetWeight: Weight? {
    guard let targetWeight = targetWeight else { return nil
}
    return targetWeight - (autoprogressLeeway ??
Weight.Zero)
  }
  fileprivate var _targetRatio: CGFloat? {
    guard let displayedTargetWeight = displayedTargetWeight
else { return nil }
    return _logWeight((displayedTargetWeight /
maxWeight.decigramValue).decigramValue)
  }
}
```

We claim:

1. A computer-implemented method, using a weighing mechanism operatively connected to a weighing application, the method comprising:

(A) determining a target weight (Wt) for a particular ingredient;

(B) determining a target range based on the target weight;

(C) obtaining a current weight (w) of the particular ingredient on the weighing mechanism;

(D) calculating an angle (α) for a progress arc, the angle (α) being based on a non-linear function of:

(i) a total angle to be drawn when the target weight (Wt) has been met, (ii) the current weight (w) of the particular ingredient, and (iii) the target weight (Wt) for the particular ingredient;

(E) drawing the progress arc on a user interface of the weighing application, said drawing being based on the angle (α) calculated in (D);

(F) determining whether the current weight (w) of the particular ingredient on the weighing mechanism, as determined in (C), is within the target range, as determined in (B); and (G) based on said determining in (F), when the current weight is determined to not be within the target range, repeating steps (C)-(F), otherwise indicating that the target weight has been met.

2. The method of claim 1, wherein the target range is within a fixed leeway of the target weight.

3. The method of claim 2, wherein the fixed leeway is about 5% of the target weight.

4. The method of claim 1, wherein the angle (α) for the progress arc is determined as:

$$\alpha = A \log_2\left(\frac{w}{Wt} + 1\right)$$

where (i) Wt is the target weight for the particular ingredient, (ii) "A" is the total angle to be drawn when the target weight (Wt) has been met, and (iii) w is the current weight of the particular ingredient.

5. The method of claim 1, further comprising:

repeating steps (A)-(G) for at least one other ingredient.

6. The method of claim 1, wherein the target range is based, at least in part, on a type of the particular ingredient.

7. The method of claim 1, wherein the target weight (Wt) for the particular ingredient is obtained from a connected recipe.

8. The method of claim 1, wherein the weighing application is implemented on a smartphone, a tablet computer, in a web browser, and/or on the screen of an appliance with an integrated user interface.

9. A computer-implemented method of carrying out a recipe, the method comprising:

(a) obtaining a recipe item or step;

(b) determining whether said recipe item or step obtained in (a) requires one or more ingredients to be weighed;

(c) based on said determining in (b), weighing each of said one or more ingredients to be weighed using the method of claim 1; and (d) repeating steps (a)-(c) while there are more recipe items or steps.

10. A computer-readable medium with one or more computer programs stored therein that, when executed by one or more processors of a device, cause the one or more processors to perform the operations of the computer-implemented method of claim 1.

11. A device comprising hardware, including one or more processors and memory, the device comprising one or more computer programs stored in the memory, that, when executed by the one or more processors of the device, cause the one or more processors to perform the operations the computer-implemented method of claim 1.

12. The device of claim 11, wherein the device comprises a scale.

* * * * *